C. ALLEN.

Copy Slips for Teaching Penmanship.

No. 6,706. Reissued Oct. 19, 1875.

Witnesses:
Michael Ryan
Fred Haynes

Campbell Allen
by his Attorneys
Brown & Allen

UNITED STATES PATENT OFFICE.

CAMPBELL ALLEN, OF ALBANY, NEW YORK.

IMPROVEMENT IN COPY-SLIPS FOR TEACHING PENMANSHIP.

Specification forming part of Letters Patent No. 161,192, dated March 23, 1875; reissue No. 6,706, dated October 19, 1875; application filed September 7, 1875.

*To all whom it may concern:*

Be it known that I, CAMPBELL ALLEN, of the city and county of Albany, in the State of New York, have invented certain new and useful Improvements in Copy-Slips for Teaching Penmanship; and I do hereby declare that the following is a full, clear, and exact description of the same, reference being had to the accompanying drawing, which forms part of this specification.

The first consideration in teaching penmanship is to impress upon the mind of the pupil an accurate idea of the proportions, curves, and slope of the letters or elements of letters to be imitated.

It is found in practice that generally, or with the exception of a few especially gifted in this regard, beginners in writing are unable to distinguish slight, and even very considerable, differences between the copy and their attempted imitation thereof, and thus the pupil continues to repeat, and often constantly increases, the same imperfection, thereby confusing more and more his mental image of what he is seeking to imitate.

This difficulty has heretofore been effectually met only by that direct constant personal attention and criticism of the instructor of the individual pupil which is possible only to those favored by private individual instruction, and cannot be given to the members of large classes in public schools, or when the pupil is practicing by himself.

The principal object of my invention is to provide a means whereby the pupil learning to write may be enabled to criticize perfectly his own work, and whereby he may see, without assistance from the teacher, exactly in what points he has failed to imitate the copy.

My invention consists in a copy-slip of novel construction, and of transparent material, having the copy to be imitated delineated upon it. By means of such transparent copy-slip the pupil is enabled, by placing said slip directly over his imitation of the copy, to detect even the minutest defect.

This transparent copy-slip it is preferable to make of sheet-gelatine, with the copy to be imitated printed upon it, and afterward varnished to make it water-proof. It may, however, be of other suitable transparent material.

Furthermore, the invention consists in providing a transparent copy-slip, for use as described, with a slightly-raised border or frame, to prevent contact between the copy-slip and the paper upon which the imitation is written, thus preventing the blotting of either the slip or the paper.

Figure 1:
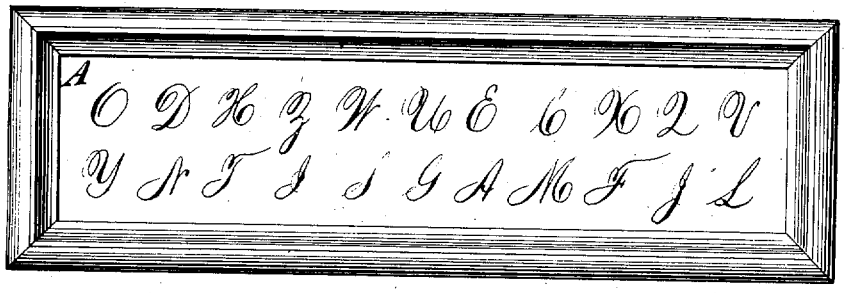
Figure 2:
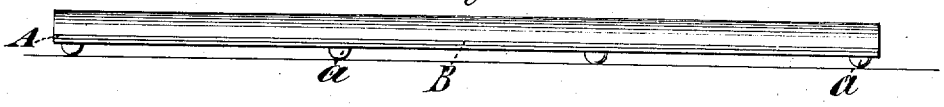
Figure 3:
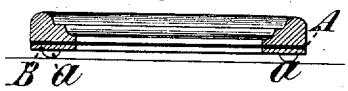

Figure 1 is a plan view of a copy-slip constructed in accordance with my invention; Fig. 2, an edge view of the same, and Fig. 3 a transverse sectional view thereof.

A is a thin sheet of any suitable transparent material, but preferably of sheet-gelatine, and having the letters or elements of letters constituting the copy printed upon it, and afterward varnished to make the copy or copy-slip thus produced water-proof. B is the slightly-raised frame or border of wood, pasteboard, or any other suitable and convenient material, along and around the edge of the copy-slip. This border may be continuous, or may consist of projections or bosses *a a* at suitable intervals.

The improved copy-slip represented in the drawing is used as follows: The pupil first seeks to imitate the particular letter or element of a letter, to which his efforts are directed, and then, by placing the copy-slip in the proper position over his imitation, which, by means of the raised border, he can do without waiting for the ink to dry, is thus enabled to see through the transparent material exactly wherein his imitation differs from the copy.

The frame or raised border B serves not only to prevent blotting, but also to extend, protect, and render rigid the copy-slip, and to facilitate handling it.

I claim—

1. The improvement in devices for teaching penmanship, consisting of a transparent copy-slip, having the copy to be imitated delineated upon it, and constructed and arranged to operate substantially as specified.

2. A transparent copy-slip, composed of sheet-gelatine, with the copy to be imitated printed or delineated upon it, and varnished, essentially as and for the purpose herein described.

3. A transparent copy-slip, combined with a raised frame or holder, substantially as herein described.

CAMPBELL ALLEN.

Witnesses:
J. H. GILBERT,
B. S. DAWSON.